US011473971B2

(12) United States Patent
Yang et al.

(10) Patent No.: US 11,473,971 B2
(45) Date of Patent: Oct. 18, 2022

(54) AMBIENT HEADROOM ADAPTATION (71) Applicant: Apple Inc., Cupertino, CA (US)

(72) Inventors: Xiaohua Yang, San Jose, CA (US); Ruiqi Hu, San Ramon, CA (US); Hao Pan, Sunnyvale, CA (US); Vaidyanath Mani, Los Altos, CA (US); Qiang Wang, Campbell, CA (US); Haiyan He, Saratoga, CA (US); Xin Wang, San Jose, CA (US); Gui Xie, Cupertino, CA (US); Jin Wook Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 16/586,411

(22) Filed: Sep. 27, 2019

(65) Prior Publication Data

US 2021/0096023 A1 Apr. 1, 2021

(51) Int. Cl.
*G01J 1/42* (2006.01)
*G06T 5/00* (2006.01)
(Continued)

(52) U.S. Cl.
CPC ............ *G01J 1/4204* (2013.01); *G06T 5/009* (2013.01); *G06T 7/11* (2017.01); *G06T 7/90* (2017.01); *H04N 1/60* (2013.01)

(58) Field of Classification Search
CPC ......... G06T 5/008; G06T 5/007; G06T 5/009; G06T 7/90; G06T 7/11; G06T 7/10; G01J 1/42; G01J 1/4204; H04N 1/62; H04N 1/6088; H04N 1/6027; H04N 1/6091; H04N 1/6086; H04N 1/6083; H04N 1/6002; H04N 1/56; H04N 1/60
See application file for complete search history.

(56) References Cited

U.S. PATENT DOCUMENTS 8,004,538 B2 * 8/2011 Alessi ..................... G06T 5/009
345/589
8,314,847 B2 * 11/2012 Brunner ................. H04N 5/235
348/222.1

(Continued)

OTHER PUBLICATIONS

Krawczyk, Grzegorz Marek, "Perception-Inspired Tone Mapping," Oct. 9, 2007.

*Primary Examiner* — John R Lee
(74) *Attorney, Agent, or Firm* — Blank Rome LLP (57) ABSTRACT

A device comprises memory, a display characterized by a display characteristic, and processors coupled to the memory. The processors execute instructions causing the processors to receive data indicative of the display characteristic, data indicative of ambient lighting, and data indicative of content characteristics for a content item; determine a tone mapping curve for the content item based on the data indicative of content characteristics; determine a first, so-called "anchor" point along the tone mapping curve; modify a first portion of the tone mapping curve below the anchor point based on the data indicative of ambient lighting; modify a second portion of the tone mapping curve above the anchor point based on the data indicative of the display characteristic; perform tone mapping for the content item based on the modified toned mapping curve to obtain a tone mapped content item; and cause the display to display the tone mapped content item.

20 Claims, 9 Drawing Sheets

(51) Int. Cl.
  *G06T 7/90*   (2017.01)
  *G06T 7/11*   (2017.01)
  *H04N 1/60*   (2006.01)

(56) References Cited

U.S. PATENT DOCUMENTS

| | | | |
|---|---|---|---|
| 8,704,859 B2* | 4/2014 | Greenebaum | G09G 5/02 |
| | | | 345/589 |
| 8,737,738 B2 | 5/2014 | Wang | |
| 8,964,124 B2* | 2/2015 | Fujine | G09G 3/34 |
| | | | 348/678 |
| 9,087,382 B2 | 7/2015 | Zhai | |
| 9,230,509 B2* | 1/2016 | Van Der Vleuten | G09G 5/02 |
| 9,420,288 B2* | 8/2016 | Mertens | H04N 19/102 |
| 10,255,879 B2 | 4/2019 | Ballestad | |
| 10,402,952 B2* | 9/2019 | Baar | G06T 5/50 |
| 10,779,013 B2* | 9/2020 | Van Der Vleuten | H04N 19/30 |
| 11,024,017 B2* | 6/2021 | Cellier | G06T 5/009 |
| 11,024,260 B2* | 6/2021 | Greenebaum | G09G 5/10 |
| 11,030,728 B2* | 6/2021 | Samadani | H04N 5/2355 |
| 11,107,204 B2* | 8/2021 | Unger | H04N 1/6027 |
| 11,107,441 B2* | 8/2021 | Ohtsuka | H04N 5/20 |
| 11,158,032 B2* | 10/2021 | Atkins | G06T 5/009 |
| 11,211,030 B2* | 12/2021 | Bonnier | G06F 3/013 |
| 2011/0164817 A1 | 7/2011 | Ubillos | |
| 2014/0225941 A1 | 8/2014 | Van Der Vleuten | |
| 2014/0247870 A1 | 9/2014 | Mertens | |
| 2016/0358346 A1 | 12/2016 | Hendry | |
| 2017/0339433 A1* | 11/2017 | Mertens | H04N 19/44 |
| 2018/0182352 A1* | 6/2018 | Ballestad | H04N 9/67 |
| 2020/0380938 A1* | 12/2020 | Greenebaum | G09G 5/10 |
| 2021/0020140 A1* | 1/2021 | Li | G09G 5/10 |
| 2021/0096023 A1* | 4/2021 | Yang | H04N 1/603 |
| 2021/0280154 A1* | 9/2021 | Miller | G09G 5/10 |

\* cited by examiner

AMBIENT HEADROOM ADAPTATION

BACKGROUND

Conventional photography and videography has traditionally captured, rendered, and displayed content with relatively limited dynamic range and in relatively limited color spaces, such as the sRGB color space standardized by the International Electrotechnical Commission as IEC 61966-2-1:1999. Subsequent improvements have allowed content to be captured, rendered, and displayed with higher dynamic ranges and in larger color spaces, such as the DCI-P3 color space, defined by Digital Cinema Initiatives and published by the Society of Motion Picture and Television Engineers in SMPTE EG 423-1 and SMPTE RP 431-2, and the even larger Rec. 2020 color space, defined by the International Telecommunication Union and published as ITU-R Recommendation BT.2020. Larger color spaces allow for a wider range of colors in content than was previously possible.

As larger color spaces have become more widely used, many consumer electronic devices (e.g., mobile phones, personal digital assistants (PDAs), head-mounted displays (HMD), monitors, televisions, laptops, desktops, and tablet computers) include display screens supporting those large color spaces and high dynamic ranges, and use software matching of primary colors and transfer functions to compensate for some display device flaws, as well as tone mapping to map high dynamic range content into standard dynamic range display devices. However, oftentimes, those corrections and tone mappings assume ideal viewing conditions, ignoring, for example, reflection off the display device, viewing angle, light leakage, screen covers (e.g., privacy screens), and the like. Consumer electronic devices are used in a multitude of different environments with different lighting conditions, e.g., the office, the home, home theaters, inside head-mounted displays (HMD), and outdoors. Without compensation for such non-ideal viewing conditions, the wide range of colors in content may be lost and/or not represented to their fullest intended extent.

Because light may generally be thought of as being additive in nature, light that is driven by, e.g., the display screen of a consumer electronic device, may be combined with light from ambient lighting conditions or light from flaws in the display screen itself, such as backlight leakage. This added light measurably changes the resulting light seen by a viewer of the display screen from the "rendering intent" of the author of the content, and may, in some cases, mask the full range, saturation, and/or contrast of colors present in the content and enabled by large color spaces or the dynamic range of the display screen.

SUMMARY

As mentioned above, human perception is not absolute; rather, it is relative. In other words, a human user's perception of a displayed image changes based on what surrounds the image, the image itself, and what range of light levels the viewer's eyes presently differentiate. A display may commonly be positioned in front of a wall. In this case, the ambient lighting in the room (e.g., brightness and color) will illuminate the wall behind the monitor and change the viewer's perception of the image on the display. Potential changes in a viewer's perception include a change to tonality, as well as changes to white point and black point. Thus, while some devices may attempt to directly map high dynamic range content to a display device's color space, this does not take into account the effect environmental conditions or display device characteristics may have on a human viewer's perception of the displayed content.

A processor in communication with the display device may determine how to map a tone mapping curve for a high dynamic range content item into a display color space associated with the display device, e.g., based on content indicators associated with the content item. The content indicators may indicate an intended viewing environment and a corresponding white point, black point, gamma boost, and the like. The processor may then determine a first point along the tone mapping curve, wherein the first point may denote a diffuse white point, a mid-tone of the content, and/or a combination of the two along the tone mapping curve, above which are highlights in the source content, and below which are tones darker than the first point. The mid-tone of the content may be, e.g., an average luminance for a frame of the content. This first point along the tone mapping curve may also be referred to herein as an "anchor point," for ease of illustration. Using the determined anchor point, the processor may then modify the tone mapping curve above and below the anchor point based on the viewer's current viewing environment and the display device's characteristics. The processor may modify a first portion of the tone mapping curve below the anchor point based on the viewer's current viewing environment and modify a second portion of the tone mapping curve above the anchor point based on the display device characteristics. The processor then performs tone mapping for the content item based on the modified tone mapping curve and causes the display device to display the tone mapped content item.

The techniques disclosed herein may use a display device, in conjunction with various optical sensors, e.g., potentially multi-spectral ambient light sensor(s), image sensor(s), or video camera(s), to collect information about the ambient conditions in the environment of a viewer of the display device. Use of these various optical sensors can provide more detailed information about the ambient lighting conditions in the viewer's environment, which the processor may utilize to modify a tone mapping curve for the content item, based at least in part, on the received environmental information and information about the display, as well as the content item itself that is being, has been, or will be displayed to the viewer. The modified tone mapping curve may be used to perform tone mapping for the content item, such that the viewer's perception of the content item displayed on the display device is relatively independent of the ambient conditions in which the display is being viewed.

Thus, according to some embodiments, a non-transitory program storage device comprising instructions stored thereon is disclosed. When executed, the instructions are configured to cause one or more processors to receive data indicative of a characteristic of a display device, data indicative of ambient light conditions, and data indicative of content characteristics for a content item; determine a tone mapping curve for the content item based on the data indicative of content characteristics; determine an anchor point along the tone mapping curve; modify a first portion of the tone mapping curve below the anchor point based on the data indicative of ambient light conditions; modify a second portion of the tone mapping curve above the anchor point based on the data indicative of the characteristic of the display device; perform tone mapping for the content item based on modified tone mapping curve to obtain a tone mapped content item; and cause the display device to display the tone mapped content item.

In some embodiments, the instructions to determine the anchor point comprise instructions to determine at least one of a mid-tone of the content item and a reference white point value. The instructions to modify the first portion of the tone mapping curve may comprise instructions to adjust the anchor point. The instructions to modify the first portion of the tone mapping curve may further comprise instructions to adjust a slope of the first portion of the tone mapping curve. In some embodiments, the instructions to modify the second portion of the tone mapping curve comprise instructions to stretch the second portion of the tone mapping curve. The data indicative of the characteristic of the display device may comprise a peak brightness level of the display device, and the instructions to stretch the second portion of the tone mapping curve may further comprise instructions to stretch the second portion of the tone mapping curve to fit a range of brightness levels between the anchor point and the peak brightness level of the display device.

In other embodiments, the aforementioned techniques embodied in instructions stored in non-transitory program storage devices may also be practiced as methods and/or implemented on electronic devices having displays, e.g., a mobile phone, PDA, HMD, monitor, television, or a laptop, desktop, or tablet computer.

DETAILED DESCRIPTION

As a user's viewing environment changes to a brighter viewing environment for instance, low brightness details may become indistinguishable. The user's viewing environment can prevent the user from perceiving the darker values encoded in an image, e.g., "shadow detail" that is "crushed" to black, that the source content author both perceived and intended that the consumer of the content perceive. Further, as the user's viewing environment changes from a suggested viewing environment, the general perceived tonality of the image will change, as is described by the adaptive process known as "simultaneous contrast." The image may also appear to have an unintended color cast as the image's white point no longer matches the adapted white point for the viewing environment. When environmental lighting is brighter than the display, e.g., a bright sky, the display's fixed brightness, and environmental light is reflected off the display, the display is able to modulate a smaller range of brightness values. Increasing a display's brightness may cause additional light to "leak" from the display, too, thus adding to the reflected light and further limiting the darkest level the display can achieve in this environment. Further, adjusting the display's brightness based on the ambient environment affects the headroom of the display device, a ratio of the peak luminance of the display device to the luminance of a diffuse, or reference, white value which represents the peak brightness for standard dynamic range content. A smaller headroom corresponds to fewer brightness levels above the diffuse white value, which may "blow out" details in those brightness levels to white.

For these factors and more, it is desirable to map the displayed content to the display's characteristics according to content indicators indicative of the intended perception of the content and based on the user's current viewing environment and the display's characteristics. Thus, there is a need for techniques to implement ambient headroom adaptation that is, e.g., capable of adjusting a tone mapping curve for high dynamic range content to a display device based on ambient conditions and display device characteristics. Successfully modeling the user's viewing environment and display device characteristics and their impact on perception of the content data displayed would allow the user's experience of the displayed content to remain relatively independent of the ambient conditions in which the display is being viewed, the capabilities of the display device, and/or the content that is being displayed.

The disclosed techniques use a display device, in conjunction with various optical sensors, e.g., ambient light sensors or image sensors, to collect information about the ambient conditions in the environment of a viewer of the display device. Use of this information—and information regarding the display device and the content being displayed—can provide a more accurate prediction of the viewer's current viewing environment and its impact on the viewer's perception of displayed content. A processor in communication with the display device may determine a tone mapping curve for the content and an anchor point along the tone mapping curve. The processor may then modify a first portion of the tone mapping curve below the anchor point based on the data indicative of the viewer's current viewing environment and modify a second portion of the tone mapping curve above the anchor point based on the display device characteristics. The processor may then perform tone mapping for the content item based on the modified tone mapping curve and cause the display device to display the tone mapped content item.

The techniques disclosed herein are applicable to any number of electronic devices: such as digital cameras, digital video cameras, mobile phones, personal data assistants (PDAs), head-mounted display (HMD) devices, monitors, televisions, digital projectors (including cinema projectors), as well as desktop, laptop, and tablet computer displays.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, with resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
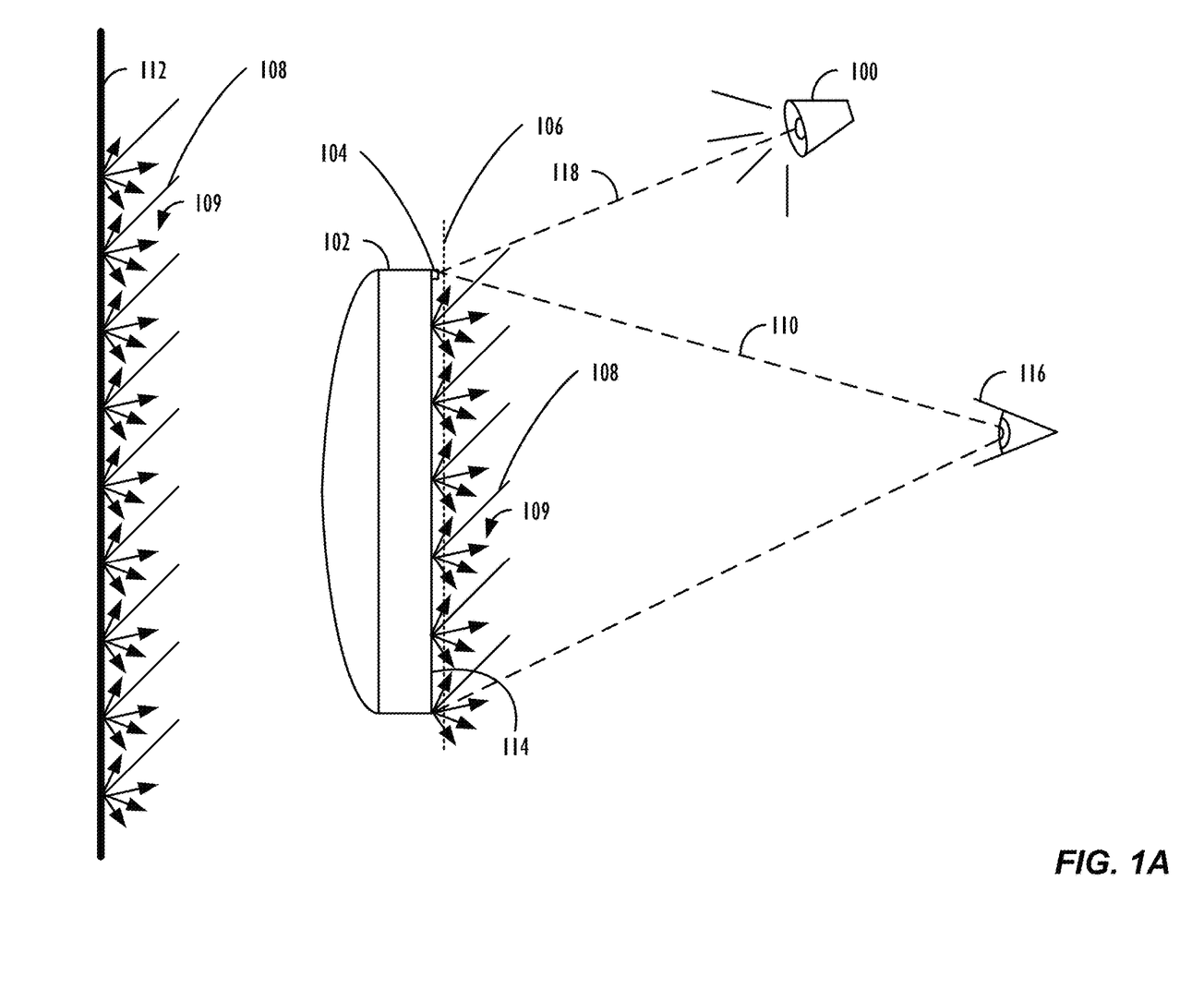
FIG. 1A illustrates the properties of ambient lighting, diffuse reflection off a display device, and other environmental conditions influencing a display device.

Referring now to FIG. 1A, the properties of ambient lighting, diffuse reflection off a display device 102, and other environmental conditions influencing the display device are shown via the depiction of a side view of a viewer 116 of the display device 102 in a particular ambient lighting environment. As shown in FIG. 1A, viewer 116 is looking at display device 102, which, in this case, is a typical desktop computer monitor. Dashed lines 110 represent the viewing angle of viewer 116. The ambient environment as depicted in FIG. 1A is lit by environmental light source 100, which casts light rays 108 onto all of the objects in the environment, including wall 112 as well as the display surface 114 of display device 102. As shown by the multitude of small arrows 109 (representing reflections of light rays 108), a certain percentage of incoming light radiation will reflect back off of the surface that it shines upon.

One phenomenon in particular, known as diffuse reflection, may play a particular role in a viewer's perception of a display device. Diffuse reflection may be defined as the reflection of light from a surface such that an incident light ray is reflected at many angles. Thus, one of the effects of diffuse reflection is that, in instances where the intensity of the diffusely reflected light rays is greater than the intensity of light projected out from the display in a particular region of the display, the viewer will not be able to perceive tonal details in those regions of this display. This effect is illustrated by dashed line 106 in FIG. 1A. Namely, intended light from the emissive display surface 114, including light leaked from the display and ambient light reflected off the face of the display, will add together. Thus, there may be a baseline brightness level (106) that the display cannot be dimmer than (this level is also referred to herein as the "pedestal" of the display).

Thus, in one or more embodiments disclosed herein, a tone mapping curve for a content item may be modified based on display device characteristics and ambient conditions, such that the contrast of colors displayed, and the dimmest colors displayed, are not masked by light leakage and/or the predicted diffuse reflection levels reflecting off of the display surface 114. Further, there is more diffuse reflection off of non-glossy displays than there is off of glossy displays, and the tone mapping curve may be modified accordingly for display type. In addition, the size of the display device 102 and the viewing distance between the viewer 116 and the display device 102 may influence the viewer's perception of the content item and, by extension, modifications to the tone mapping curve for the content item.

The predictions of diffuse reflection levels may be based off of light level readings recorded by one or more optical sensors, e.g., ambient light sensor 104. Dashed line 118 represents data indicative of the light source being collected by ambient light sensor 104. Optical sensor 104 may be used to collect information about the ambient conditions in the environment of the display device and may comprise, e.g., an ambient light sensor, an image sensor, or a video camera, or some combination thereof. A front-facing image sensor provides information regarding how much light (and, in some embodiments, what color of light) is hitting the display surface 114. This information may be used in conjunction with a model of the reflective and diffuse characteristics of the display to determine where to move the black point for the particular lighting conditions that the display is currently in and that the user is currently adapted to.

Although optical sensor 104 is shown as a "front-facing" image sensor, i.e., facing in the general direction of the viewer 116 of the display device 102, other optical sensor types, placements, positioning, and quantities are possible. For example, one or more "back-facing" image sensors alone (or in conjunction with one or more front facing sensors) could give even further information about light sources and the color in the viewer's environment. The back-facing sensor picks up light re-reflected off objects behind the display and may be used to determine the brightness of the display's surroundings, i.e., what the user sees beyond the display. This information may also be used to modify the tone mapping curve for the content item. For example, the color of wall 112, if it is close enough behind display device 102 could have a profound effect on the viewer's perception. Likewise, in the example of an outdoor environment, the color and intensity of light surrounding the viewer can make the display appear different than it would an indoor environment with, e.g., incandescent (colored) lighting.

In one embodiment, the optical sensor 104 may comprise a video camera (or other devices) capable of capturing spatial information, color information, as well as intensity information. With regard to spatial information, a video camera or other device(s) may also be used to determine a viewing user's distance from the display, e.g., to further model how much of the user's field of view the display fills and, correspondingly, how much influence the display/environment will have on the user's perception of displayed content. Thus, utilizing a video camera could allow for modification of the tone mapping curve to adjust the black point and white point of the display device. This may be advantageous, e.g., due to the fact that a fixed white point system is not ideal when displays are viewed in environments of varying ambient lighting levels and conditions. In some embodiments, a video camera may be configured to capture images of the surrounding environment for analysis at some predetermined time interval, e.g., every two minutes, thus allowing the environmental conditions model to be gradually updated as the ambient conditions in the viewer's environment change.

Additionally, a back-facing video camera used to model the surrounding environment could be designed to have a field of view roughly consistent with the calculated or estimated field of view of the viewer of the display. Once the field of view of the viewer is calculated or estimated, e.g., based on the size or location of the viewer's facial features as recorded by a front-facing camera, assuming the native field of view of the back-facing camera is known and is larger than the field of view of the viewer, the system may then determine what portion of the back-facing camera image to use in the surround computation.

In still other embodiments, one or more cameras or depth sensors may be used to further estimate the distance of particular surfaces from the display device. This information could, e.g., be used to further inform the modifications to the tone mapping curve based on the likely composition of the viewer's surround and the perceptual impacts thereof. For example, a display with a 30" diagonal sitting 18" from a user will have a greater influence on the user's vision than the same display sitting 48" away from the user, filling less of the user's field of view.

Figure 1B:
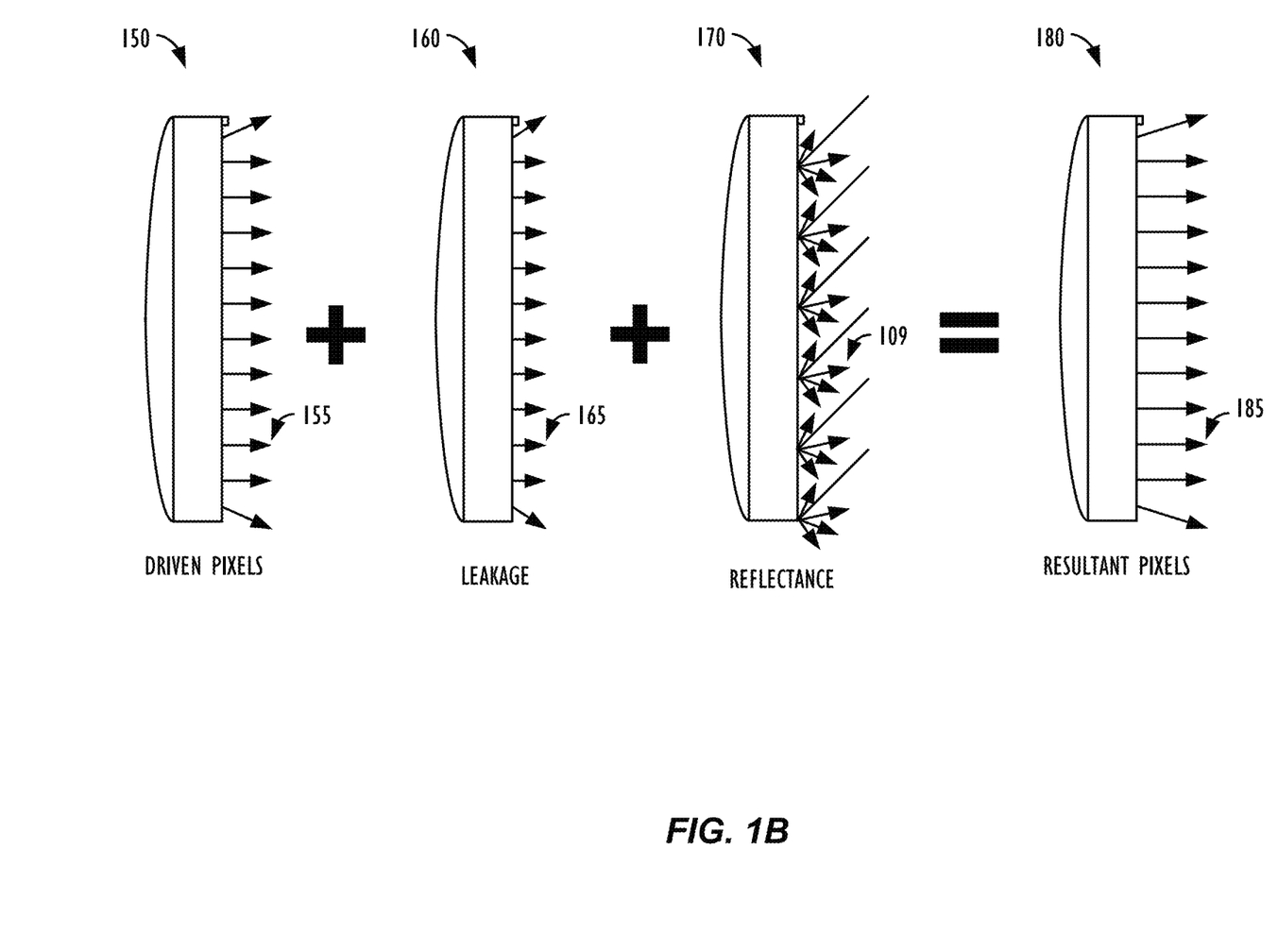
FIG. 1B illustrates the additive effects of unintended light on a display device.

Referring now to FIG. 1B, another illustration of the additive effects of unintended light on a display device is shown. For example, the light rays 155 emitting from display representation 150 represent the amount of light that the display is intentionally driving the pixels to produce at a given moment in time. Likewise, light rays 165 emitting from display representation 160 represent the amount of light leakage from the display at the given moment in time, and light rays 109 reflecting off display representation 170 represent the aforementioned reflectance of ambient light rays off the surface of the display at the given moment in time. Finally, display representation 180 represents the summation of the three forms of light illustrated in display representations 150, 160, and 170. As illustrated in FIG. 1B, the light rays 185 emitting from display representation 180 represent the actual amount of light that will be perceived by a viewer of the display device at a given moment in time, which amount is, as explained above, different than the initial amount of light 155 the display was intentionally driven with in order to produce the desired content at the given moment in time. Thus, accounting for the effects of these various phenomenon may help to achieve a more consistent and content-accurate perceptual experience for a user viewing the display.

Figure 2:
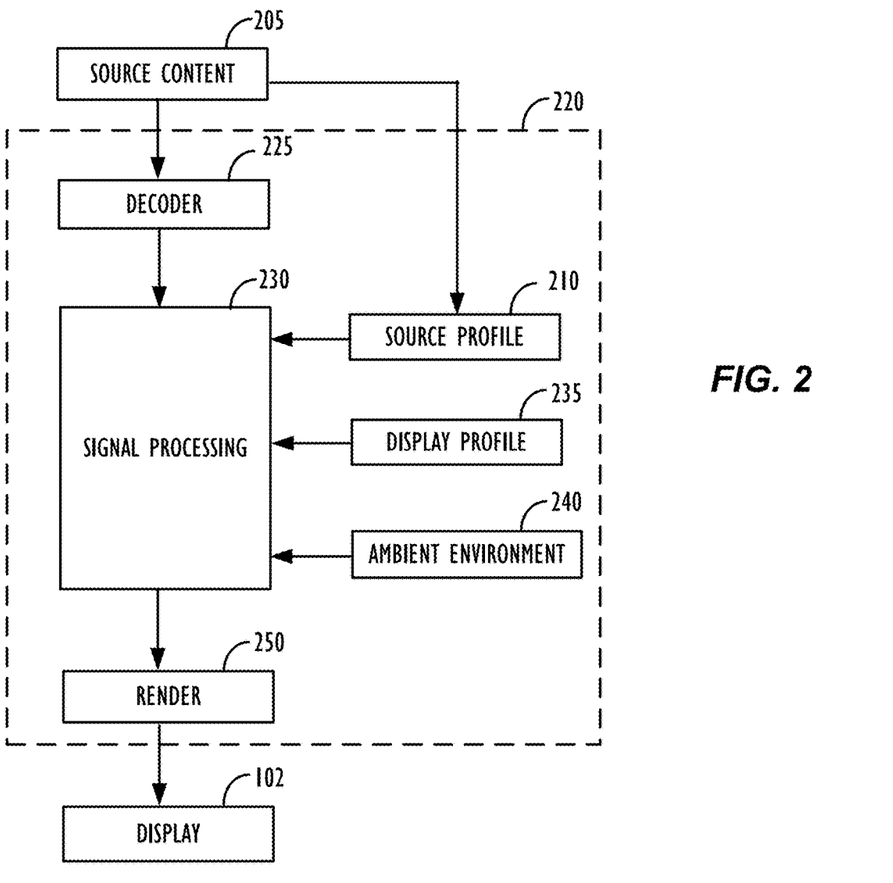
FIG. 2 illustrates a system for performing headroom adaptation based on ambient conditions, in accordance with one or more embodiments.

Referring now to FIG. 2, a system 220 for performing headroom adaptation based on ambient conditions and device characteristics is shown. Element 205 represents the source content, created by, e.g., a source content author, a viewer wishes to view. Source content 205 may comprise a high dynamic range image, video, or other displayable content type. Element 210 represents the source profile, that is, information describing the color profile and display characteristics of the device on which source content 205 was authored by the source content author. Source profile 210 may comprise, e.g., an ICC profile of the author's device or color space (which will be described in further detail below), or other related information.

Information relating to the source content 205 and source profile 210 may be sent to a viewer's device containing the system 220 for performing headroom adaptation based on ambient conditions and device characteristics. A viewer's device may comprise, for example, a mobile phone, PDA, HMD, monitor, television, or a laptop, desktop, or tablet computer. Upon receiving the source content 205 and source profile 210, a decoder 225 may decode the received data, e.g., by performing gamma decoding or gamut mapping, i.e., color matching across various color spaces. For instance, gamut matching tries to preserve (as closely as possible) the relative relationships between colors (e.g., as authored/approved by the content author on the display described by the source ICC profile), even if all the colors must be systematically changed or adapted in order to get them to display on the destination device.

Once the source content 205 has been decoded, signal processing 230 is performed on the decoded content based on the source profile 210, a display profile 235, and an ambient environment 240. Signal processing 230 is described further herein with reference to FIG. 3 and may include determining a tone mapping curve for the source content 205 based on the source profile 210. Because the tone mapping curve for mapping a particular color space into a display color space is based on an industry standard, the tone mapping curve may be stored in a look up table (LUT), sometimes stored on a video card or in other memory. The LUT may comprise a two-column table of positive, real values spanning a particular range, e.g., from zero to one. The first column values may correspond to an input image value, whereas the second column value in the corresponding row of the LUT may correspond to an output image value that the input image value will be mapped to on display 102. In other embodiments, a LUT may have separate channels for each primary color in a color space, e.g., a LUT may have Red, Green, and Blue channels in the sRGB color space.

The standardized tone mapping curve is then modified to account for the display device 102's unique characteristics based on the display profile 235 and for the viewer's current ambient environment based on the ambient environment 240. The modified tone mapping curve may comprise a modification to the display's white point, black point, and/or contrast, or a combination thereof. For reference, "black point" may be defined as the lowest level of light to be used on the display in the current ambient environment, such that the lowest images levels are distinguishable from each other (i.e., not "crushed" to black) in the presence of the current pedestal level (i.e., the sum of reflected and leaked light from the display). "White point" may be defined as the color of light (e.g., as often described in terms of the CIE XYZ color space) that the user, given their current viewing environment, perceives as being a pure/neutral white color.

In some embodiments, the black level for a given ambient environment is determined, e.g., by using an ambient light sensor 104 or by taking measurements of the actual panel and/or diffuser of the display device. As mentioned above in reference to FIG. 1A, diffuse reflection of ambient light off the surface of the device may add to the intended display values and affect the user's ability to perceive the darkest display levels (a phenomenon also known as "black crush"). In other environments, light levels below a certain brightness threshold will simply not be visible to the viewer. Once this level is determined, the black point may be adjusted accordingly.

In another embodiment, the white point, i.e., the color a user perceives as white for a given ambient environment, may be determined similarly, e.g., by using one or more optical sensors 104 to analyze the lighting and color conditions of the ambient environment. The white point for the display device may then be adapted to be the determined white point from the viewer's surround. Additionally, it is noted that modifications to the white point may be asymmetric between the LUT's Red, Green, and Blue channels, thereby moving the relative RGB mixture, and hence the white point.

In another embodiment, a color appearance model (CAM), such as the CIECAM02 color appearance model, may further inform the modifications to the tone mapping curve. The CAM may, e.g., be based on the brightness and white point of the viewer's surround, as well as the field of view of the display subtended by the viewer's field of vision. In some embodiments, knowledge of the size of the display and the distance between the display and the viewer may also serve as useful considerations. Information about the distance between the display and the user could be retrieved from a front-facing image sensor, such as front-facing camera 104. For example, as discussed previously herein, the brightness and white point of the viewer's surround may be used to determine a ratio of diffuse white brightness to the viewing surround brightness. The diffuse white brightness may be determined based on the screen brightness of the display. Based on the determined ratio, a particular adjustment may be made to the tone mapping curve. For example, for pitch black ambient environments, increasing the anchor point may increase eye fatigue for the viewer, whereas increasing the anchor point may be appropriate for a bright or sun-lit environment. A more detailed model of surround conditions is provided by the CIECAM02 specification.

The modifications to the tone mapping curve may be implemented in the LUT. After modification, the LUT may serve to make the display's tone mapping curve adaptive and "environmentally-aware" of the viewer's current ambient conditions and the content that is being, has been, or will be viewed. (As mentioned above, different mechanisms, i.e., other than LUTs, may also be used to implement the modifications to the tone mapping curve.) In some embodiments, the modifications to the tone mapping curve and/or the LUT may be implemented gradually (e.g., over a determined interval of time, based on the rate at which it is predicted the viewer's vision will adapt to the changes, etc.). The modified tone mapping curve may then be used to perform tone mapping on the decoded content. The tone mapped content is rendered by a rendering engine 250, which causes display 102 to display the rendered content.

Figure 3:
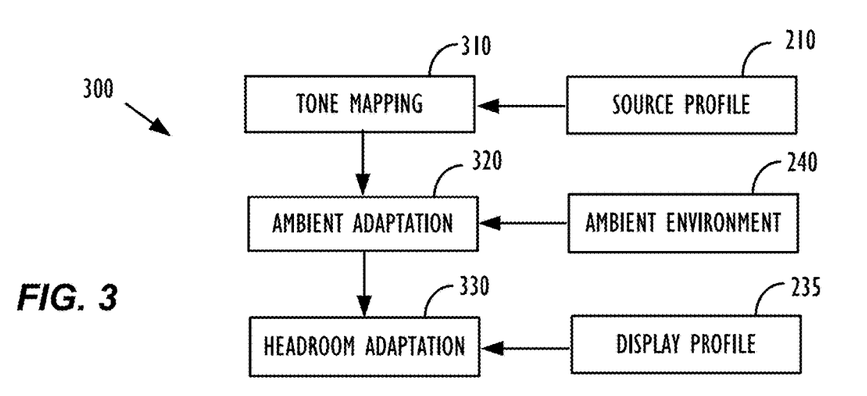
FIG. 3 illustrates, in flowchart form, a process for performing headroom adaptation based on ambient conditions, in accordance with one or more embodiments.

Referring now to FIG. 3, a process 300 for performing headroom adaptation based on ambient conditions is shown in flowchart form. Process 300 is described herein with occasional references to FIGS. 4-8, for ease of explanation. An appropriate tone mapping curve for the source content 205 is selected at Step 310, based on the corresponding source profile 210. As discussed previously herein with reference to FIG. 2, the tone mapping curve for mapping a particular color space into a display color space may be based on an industry standard, in which case the tone mapping curve may be stored in a LUT. The tone mapping curve smoothly maps the source content 205 into the display device's color gamut, dynamic range, and the like, and accounts for display device characteristics, such as the native luminance response, the color gamut, the display device type, peak brightness, black point, white point, display dimensions, color primaries, and the like, which information may be stored in an ICC profile.

Source profile 210 may include indicators to specify particular adaptation algorithms for adapting the content item from the source color space to the display color space. For example, RGB based gamma for rec.709 video, as classically applied via a mismatch between content encoding gamma and the display's decoding response. Source profile 210 may also include content information such as minimum brightness, maximum brightness, mid-tone at which the source author intends to optimize the content contrast, the ICC color profile, and other content indicators the source author attached to the content to specify the content's "rendering intent."

The ICC profile is a set of data that characterizes a color input or output device, or a color space, according to standards promulgated by the International Color Consortium (ICC). ICC profiles may describe the color attributes of a particular device or viewing requirement by defining a mapping between the device source or target color space and a profile connection space (PCS), usually the CIE XYZ color space. ICC profiles may be used to define a color space generically in terms of three main pieces: 1) the color primaries that define the gamut; 2) the transfer function (sometimes referred to as the gamma function); and 3) the white point. ICC profiles may also contain additional information to provide mapping between a display's actual response and its "advertised" response, i.e., its tone response curve (TRC), for instance, to correct or calibrate a given display to a perfect 2.2 gamma response.

Figure 4:
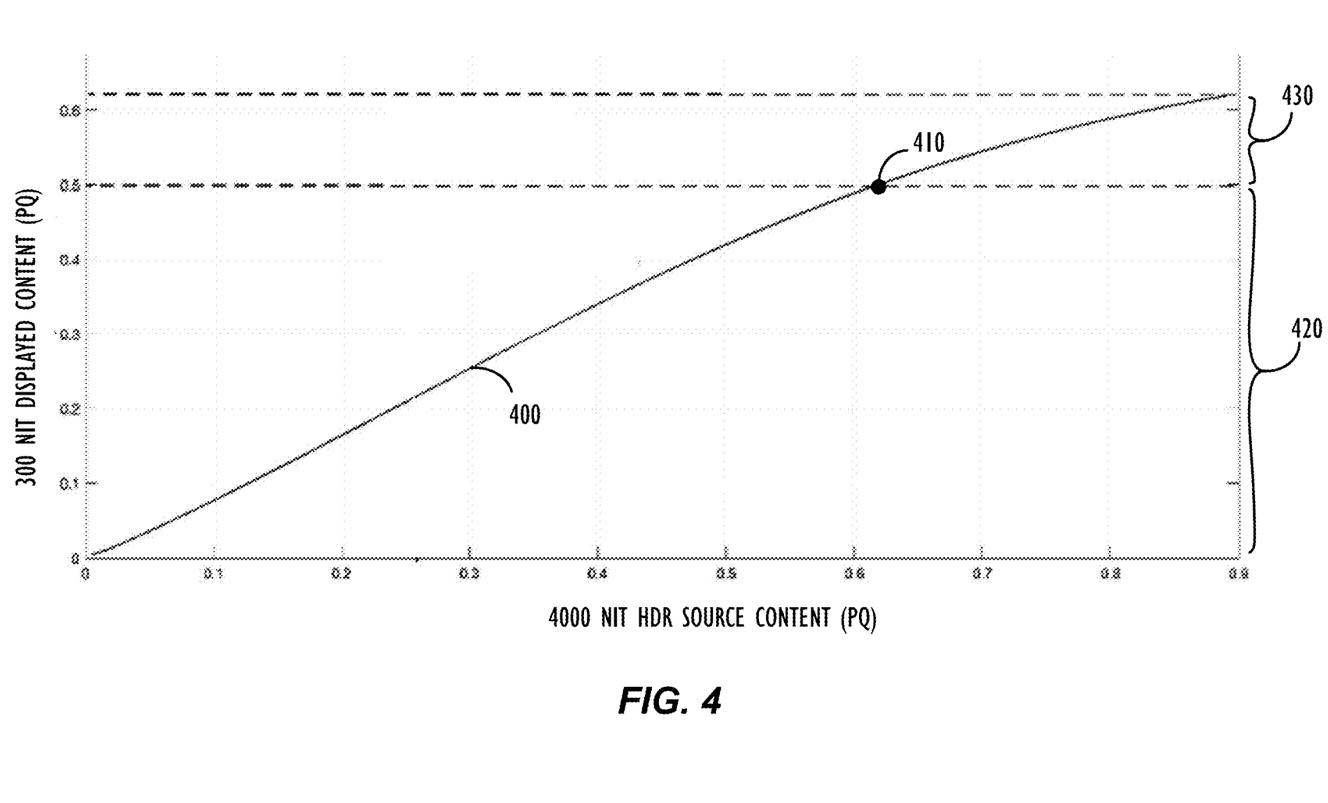
FIG. 4 illustrates a graph of a tone mapping curve for mapping high dynamic range content from a 4,000 nit source to a 300 nit display device.

An example tone mapping curve 400 is shown in FIG. 4, and illustrates a possible mapping for high dynamic range content 205 from a 4,000 nit source to a 300 nit display device. The axes are shown in a logarithmic scale known in the art as perceptual quantization (PQ), in which the perceptual quantization is a gamma curve with a peak luminance fixed at 10,000 candelas per meter squared. Tone mapping curve 400 includes a first point, e.g., a determined anchor point 410, which divides the tone mapping curve 400 into two portions: a first portion 420 below the anchor point 410 and a second headroom portion 430 above the anchor point 410. The first portion 420 and the second portion 430 may be modified separately and/or together to accommodate ambient conditions and display device characteristics. The anchor point 410 may be determined based on a diffuse white point of the display device, the mid-tone of the source content 205 indicated in the source profile 210, or a combination thereof. In some embodiments, the anchor point 410 is an average of the diffuse white point and the mid-tone. The first portion 420 of the tone mapping curve 400 includes the portion of the source content 205 darker than the anchor point 410, and may be impacted by ambient lighting conditions, e.g., dark tones being "crushed" to black, more than the second portion 430 of the tone mapping curve 400. The second portion 430 of the tone mapping curve 400 includes the highlights in source content 205 brighter than the anchor point 410, and may be impacted by the value of the anchor point 410 and display device characteristics, e.g., details in the highlights being "blown out" to white, more than the first portion 420 of the tone mapping curve 400. By modifying the first portion 420 and the second portion 430 of the tone mapping curve 400 separately, the unique influences on perception of darker tones in source content 205 below the anchor point 410 and highlights in source content 205 above the anchor point 410 can be mitigated.

Returning to process 300 shown in FIG. 3, ambient adaptation is performed on the tone mapping curve 400 from Step 310 during Step 320 based on information indicative of the ambient environment 240. Information indicative of the ambient environment 240 may include information from ambient light sensor(s)/image sensor(s) 104, and may comprise information regarding the brightness and color of ambient light in the viewer's environments, the distance and/or eye location of a viewer of the display, and the like. As discussed previously herein with reference to FIG. 4, the first portion 420 of the tone mapping curve 400 below the anchor point 410 and the second portion 430 of the tone mapping curve 400 above the anchor point 410 may be modified separately. The first portion 420 of the tone mapping curve 400 may be affected by ambient conditions more than the second portion 430 of the tone mapping curve 400. For example, the shadow details in the source content 205 below the anchor point 410 may be masked when ambient light is brighter than the level that the display device is being driven at.

The first portion 420 of the tone mapping curve 400 may be modified based on ambient environment 240 by adjusting the steepness of tone mapping curve 400 and/or by adjusting the anchor point 410. As is to be understood, the exact manner in which ambient adaptations are performed on the tone mapping curve 400 based on information indicative of the ambient environment 240 received from the various sources optical sensors 104 and how it modifies the resultant tone mapping curve, e.g., by modifying LUT values, including how quickly such modifications take place, are up to the particular implementation and desired effects of a given system.

Figure 5:
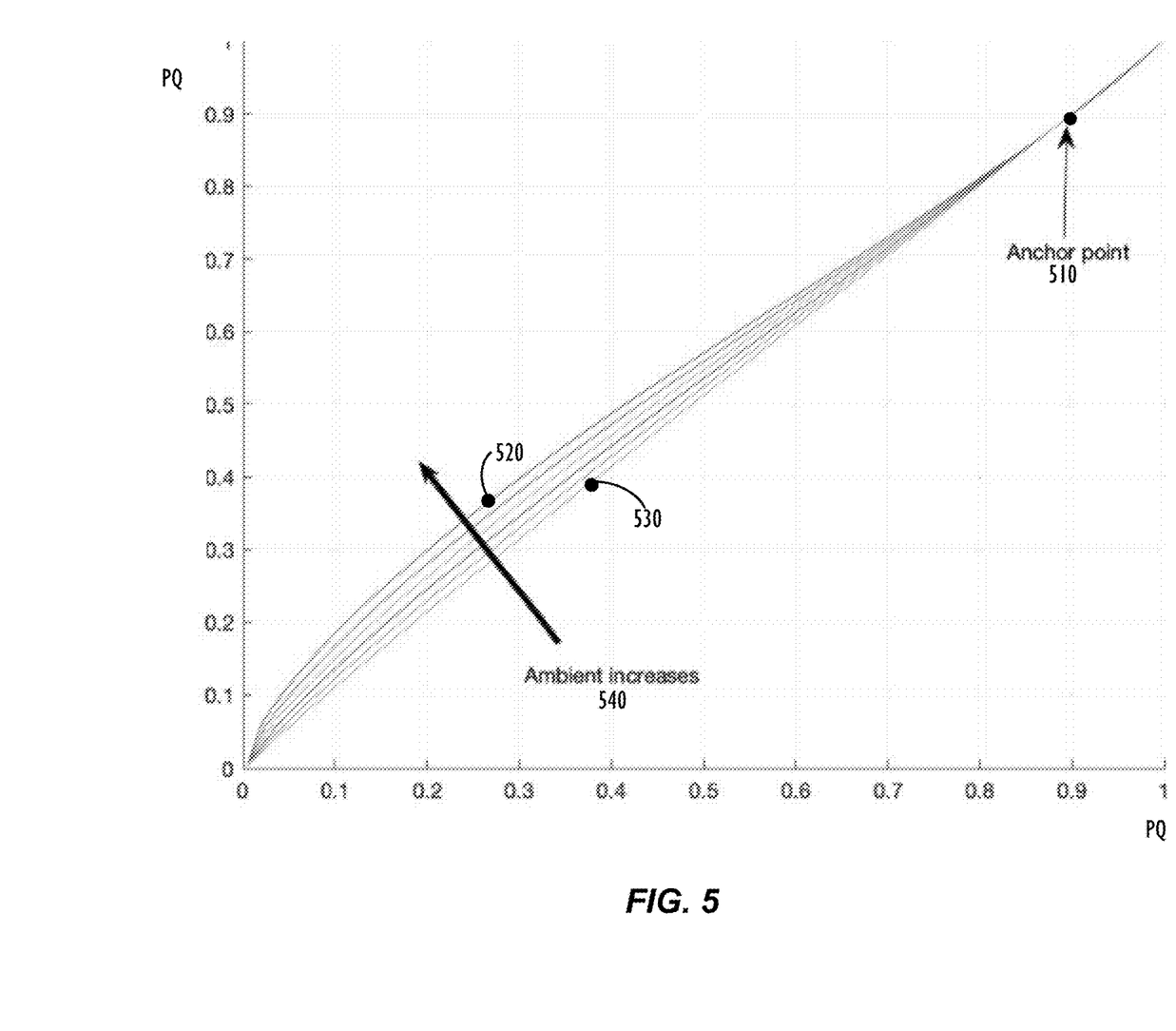
FIG. 5 illustrates a graph of first portions from several tone mapping curves showing a contrast adjustment for the first portions based on ambient conditions.

FIG. 5 illustrates possible adjustments to the steepness of a tone mapping curve to increase contrast in the first portion of the tone mapping curve below the anchor point. The axes are shown in the PQ logarithmic scale. For a fixed anchor point 510, the steepness of the tone mapping curve below the anchor point 510 is increased as ambient light increases, indicated by arrow 540. The first portion 520 corresponds to a higher contrast than the first portion 530. As discussed previously herein, the first portion of the tone mapping curve below the anchor point includes shadow details and darker tones of the source content 205, the appearance of which is more sensitive to ambient lighting than highlights in the source content 205 above the anchor point. Increasing the steepness of the tone mapping curve below the anchor point as ambient light increases preserves the contrast and details in the darker tones of source content 205. Although not shown in FIG. 5, the adjustments to the steepness of a tone mapping curve influences the second portion above the fixed anchor point 510.

Figure 6:
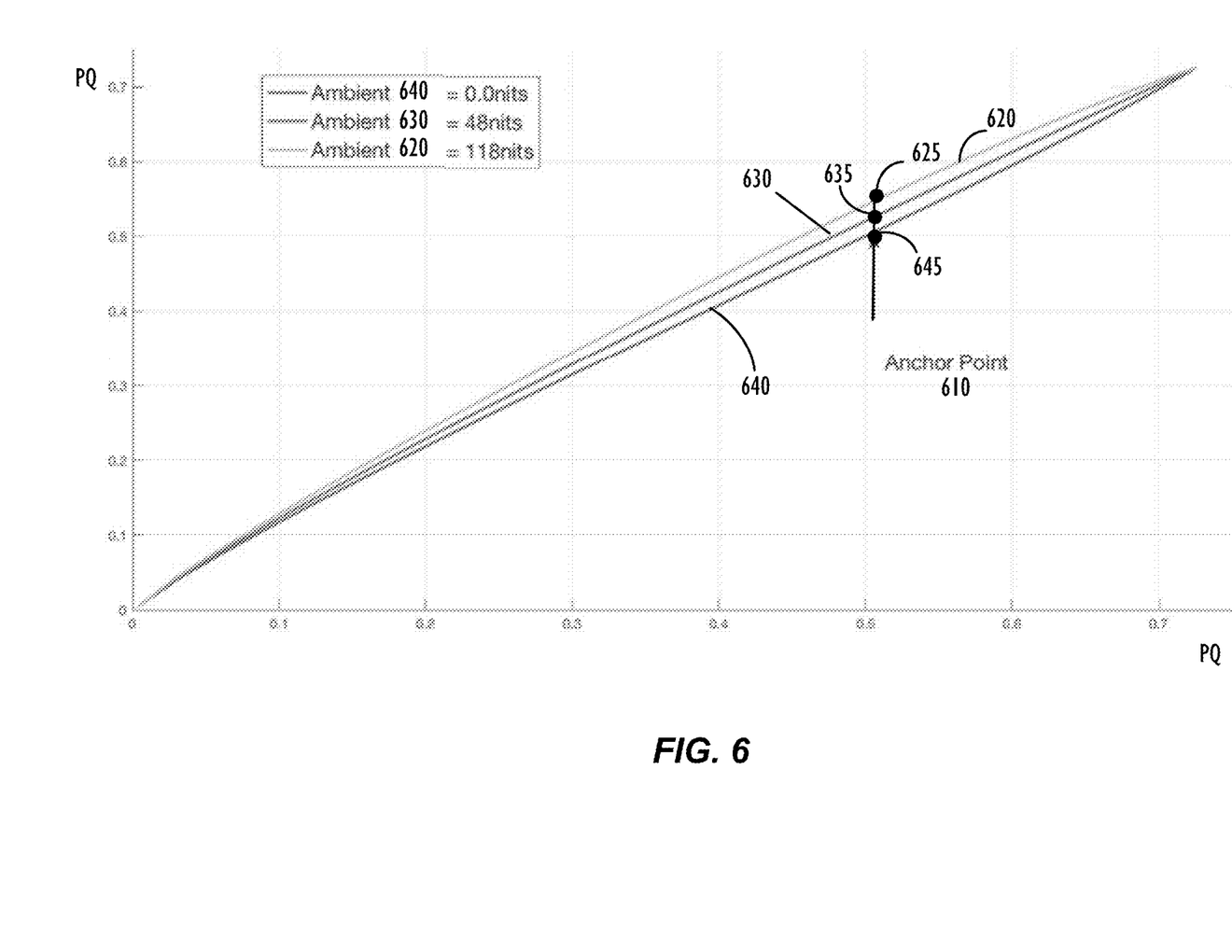
FIG. 6 illustrates a graph of first portions from several tone mapping curves showing an anchor point adjustment for the first portions based on ambient conditions.

FIG. 6 illustrates possible adjustments to the anchor point 610 based on ambient environment 240. The axes are shown in the PQ logarithmic scale. The first portion 620 corresponds to an ambient light of 118 nits, the first portion 630 corresponds to an ambient light of 48 nits, and the first portion 640 corresponds to an ambient light of zero nits, an entirely dark environment such as a movie theater. The anchor point 625 for the first portion 620, 118 nits of ambient light, is set at a greater output value than the anchor point 635 for the first portion 630, 48 nits of ambient light, and the anchor point 645 for the first portion 640, no ambient light. The first portion 620 corresponds to a higher contrast than the first portions 630 and 640. The first portion 640 corresponds to a lower contrast than the first portions 620 and 630. Increasing the value of the anchor point increases brightness at the anchor point and preserves contrast at the mid-tone for source content 205. The increase in value of the anchor point is chosen to preserve details in the darker tones of source content 205 below the anchor point without over boosting the average picture level and blowing out details in the highlights of source content 205 above the anchor point to white. In some embodiments, the adjustment to the anchor point is proportional to the change in ambient lighting. For example, the value of the adjusted anchor point in nits may be substantially equal to the value of the original anchor point in nits plus the ambient light in nits.

Returning to process 300 shown in FIG. 3, headroom adaptation is performed on the second portion 430 of the modified tone mapping curve from Step 320 during Step 330 based on display profile 235. Display profile 235 may comprise information regarding the display device's color space, native display response characteristics or abnormalities, headroom, reflectiveness, leakage, 'first code different than black,' a characterization of the amount of pixel crosstalk across the various color channels of the display or even the type of screen surface used by the display. For example, an "anti-glare" display with a diffuser will "lose" many more black levels at a given (non-zero) ambient light level than a glossy display will. One goal of the process 300 is to match the average picture level between high dynamic range and standard dynamic range content, such that the primary difference between presentation of the standard dynamic range content and presentation of the high dynamic range content is the highlights in the high dynamic range content above the anchor point.

The second portion of the modified tone mapping curve may be stretched or compressed to fill more or fewer brightness levels based on the headroom of the display device indicated in display profile 235. The headroom of the display device is a ratio of the peak luminance of the display device to the luminance of the anchor point. The second portion of the modified tone mapping curve may be stretched in the headroom of the display device so the highlights in source content 205 are not over-boosted and "blown out" to white, which preserves details in the highlights in source content 205. For example, when a display device for a mobile electronic device in a dark room with a low screen brightness is held close to the viewer's eyes, over-bright highlights in source content 205 may cause eye fatigue for the viewer. Examples of headroom adaptation on the tone mapping curve are described further herein with reference to FIGS. 7 and 8. As is to be understood, the exact manner in which headroom adaptation is performed on the tone mapping curve based on information indicative of display device characteristics included in display profile 235, and how it modifies the resultant tone mapping curve, e.g., by modifying LUT values, including how quickly such modifications take place, are up to the particular implementation and desired effects of a given system.

Figure 7:
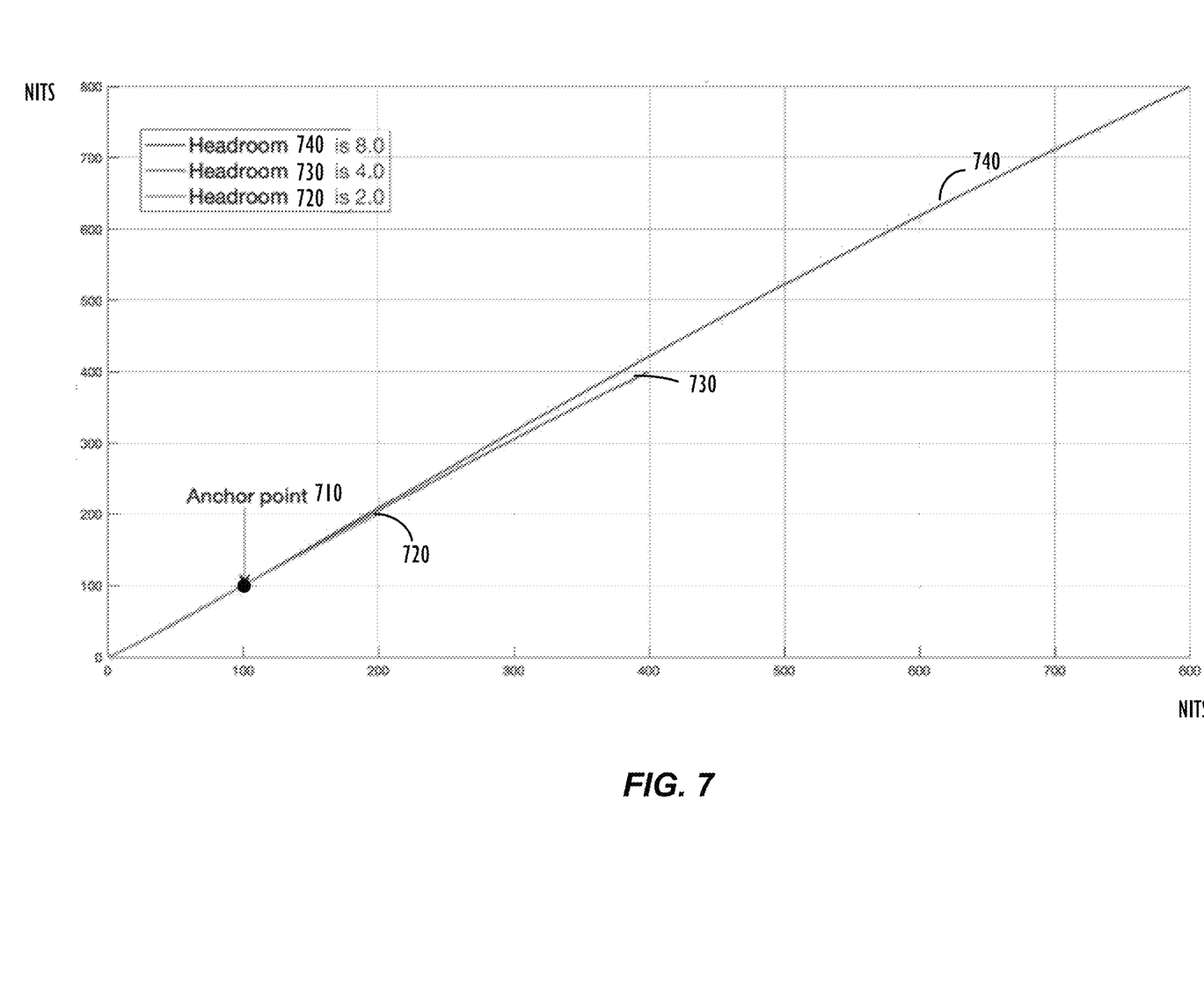
FIG. 7 illustrates a graph of second portions from several tone mapping curves showing headroom adaptation for the second portions based on display device characteristics.

FIG. 7 illustrates possible adjustments to the second portion 430 of the modified tone mapping curve from Step 320 based on the headrooms of different display devices. The axes are shown in a linear scale corresponding to nits, in contrast to the graphs shown in FIGS. 4-6. For a fixed anchor point 710 corresponding to 100 nits, the second portion 720 corresponds to a display device with a peak luminance of 200 nits and a headroom of 2.0, the second portion 730 corresponds to a display device with a peak luminance of 400 nits and a headroom of 4.0, and second portion 740 corresponds to a display device with a peak luminance of 800 nits and a headroom of 8.0. The highlights in source content 205 are stretched across 700 nits for second portion 740, compared to only 100 nits for second portion 720, and thus may be viewed in greater detail for second portion 740. In contrast, highlights in source content 205 are compressed to only 100 nits for second portion 720, and details may be "blown out" to white.

Figure 8:
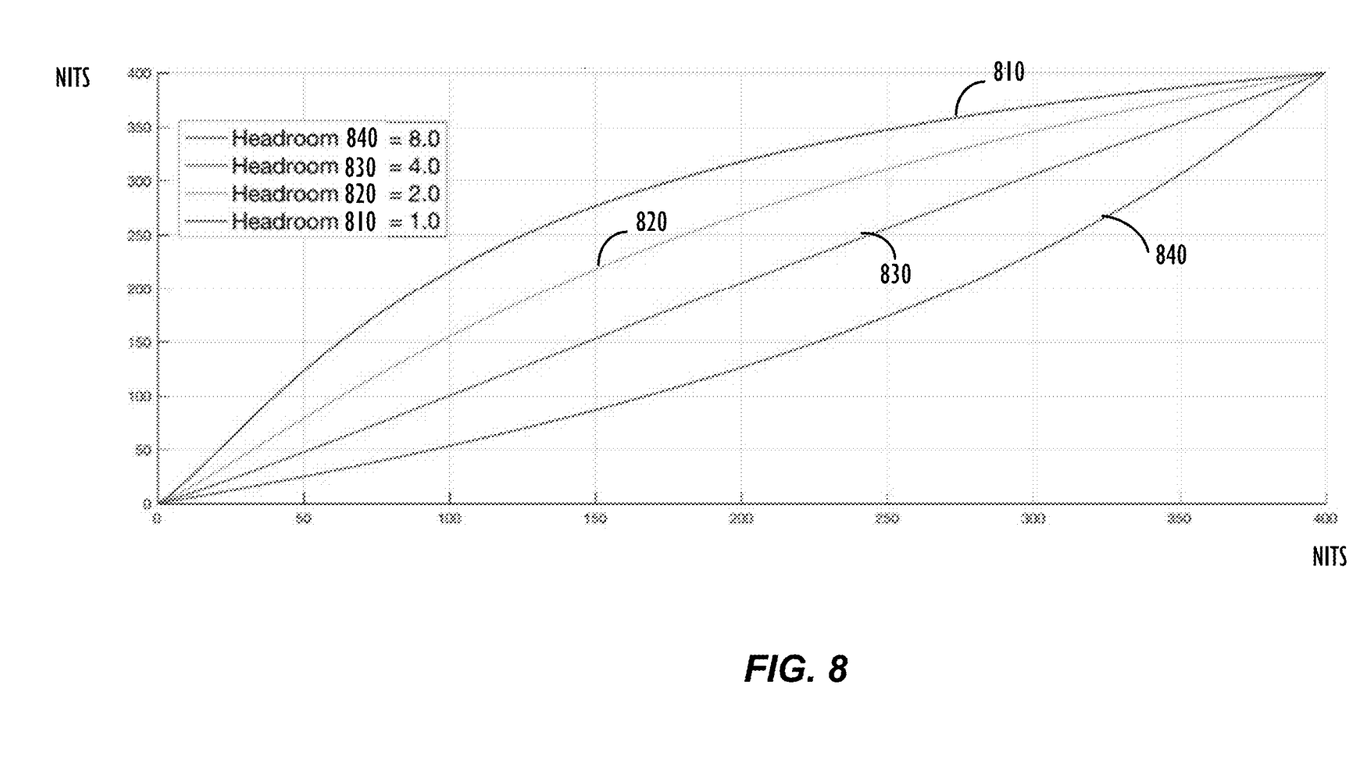
FIG. 8 illustrates a graph of second portions from several tone mapping curves showing headroom adaptation for the second portions based on ambient conditions and an adjustment to first portions of the several tone mapping curves.

Adjustments to the second portion of the modified tone mapping curve from Step 320 based on adjustments to the anchor point and the corresponding changes to the headroom of the display device are illustrated in FIG. 8, which shows four possible tone mapping curves for a display device with a peak luminance of 400 nits. The axes are shown in a linear scale corresponding to nits. Tone mapping curve 810 corresponds to an anchor point at 400 nits and a headroom of 1.0, and leaves no luminance above the anchor point for highlights in source content 205. Tone mapping curve 820 corresponds to an anchor point at 200 nits and a headroom of 2.0, and stretches highlights in source content 205 across 200 nits, compressing the highlights less than tone mapping curve 810. Tone mapping curve 830 corresponds to an anchor point at 100 nits and a headroom of 4.0, and stretches highlights in source content 205 across 300 nits, compressing the highlights less than tone mapping curves 810 and 820. Tone mapping curve 840 corresponds to an anchor point at 50 nits and a headroom of 8.0, and stretches highlights in source content 205 across 350 nits, compressing the highlights less than tone mapping curves 810, 820, and 830.

Returning to process 300 shown in FIG. 3, in some embodiments, modifications to the tone mapping curve may be implemented by changing existing table values (e.g., as stored in one or more calibration LUTs, i.e., tables configured to give the display a 'perfectly' responding tone mapping curve). Such changes may be performed via looking up the value for the transformed value in the original table, or by modifying the original table 'in place' via a warping technique. For example, the aforementioned black level (and/or white level) adaptation processes may implemented via a warped compression of the values in the table up from black (and/or down from white).

Many displays have independent: (a) pixel values (e.g., R/G/B pixel values); (b) display colorimetry parameters (e.g., the XYZ definitions of the R/G/B color primaries for the display, as well as the white point and display transfer functions); and/or (c) backlight (or other brightness) modifiers. Knowledge of the factors (a), (b), and (c) enumerated above for the given display may be used to map the content values into CIE XYZ color space (e.g., scaled according to a desired luminance metric, such as a nit) in order to ensure the modifications to the tone mapping curve will have the desired perception in the current viewing surround. The modified tone mapping curve may be used to convert between the input signal data values and the voltage values that can be used to drive the display to generate a pixel brightness corresponding to the perceptual bin that the transfer function has mapped the input signal data value to at the given moment in time.

Figure 9:
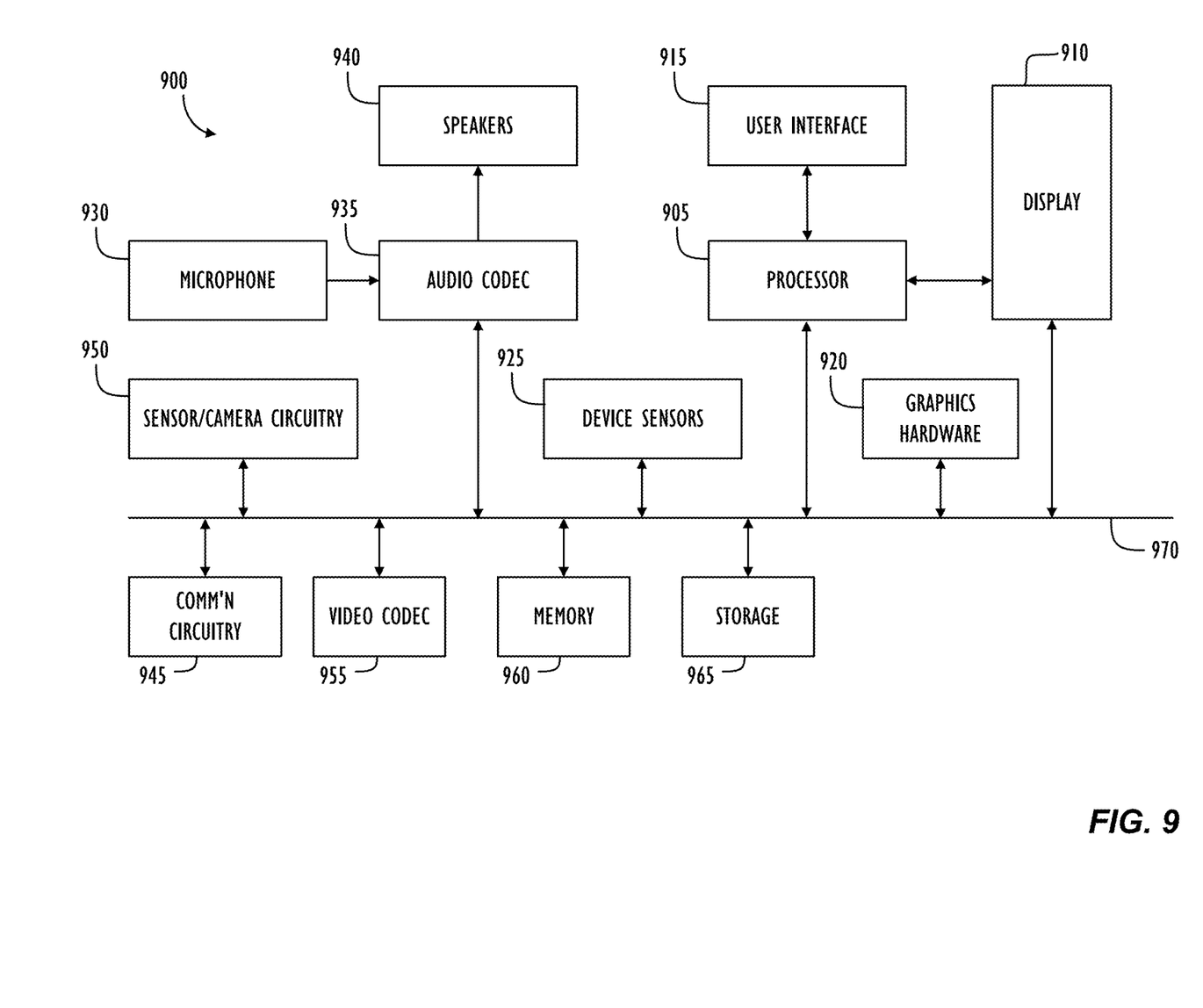
FIG. 9 illustrates a simplified functional block diagram of a device possessing a display, in accordance with one embodiment.

Referring now to FIG. 9, a simplified functional block diagram of a representative electronic device possessing a display is shown, in accordance with some embodiments. Electronic device 900 could be, for example, a mobile telephone, personal media device, HMD, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image sensor/camera circuitry 950, which may, e.g., comprise multiple camera units/optical sensors having different characteristics (as well as camera units that are housed outside of, but in electronic communication with, device 900), video codec(s) 955, memory 960, storage 965, and communications bus 970.

Processor 905 may execute instructions necessary to carry out or control the operation of many functions performed by device 900 (e.g., such as the generation and/or processing of signals in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured image or video stream and/or indicate particular frame(s) that the user would like to have played/paused, etc., or have particular adjustments applied to (e.g., by clicking on a physical or virtual button at the moment the desired frame is being displayed on the device's display screen).

In one embodiment, display 910 may display a video stream as it is captured, while processor 905 and/or graphics hardware 920 modify a tone mapping curve, optionally storing the video stream in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Image sensor/camera circuitry 950 may comprise one or more camera units configured to capture images, e.g., images which indicate ambient lighting conditions in the viewing environment and may have an effect on the modifications to the tone mapping curve, e.g., in accordance with this disclosure. Output from image sensor/camera circuitry 950 may be processed, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905, graphics hardware 920, and image sensor/camera circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905, such computer program code may implement one or more of the methods described herein.

The foregoing description of preferred and other embodiments is not intended to limit or restrict the scope or applicability of the inventive concepts conceived of by the Applicants.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method, comprising:
   receiving data indicative of a characteristic of a display device, data indicative of ambient light conditions, and data indicative of content characteristics for a content item;
   determining a tone mapping curve for the content item based on the data indicative of content characteristics;
   determining a first point along the tone mapping curve;
   modifying a first portion of the tone mapping curve below an input signal data value corresponding to the first point based on the data indicative of ambient light conditions;

modifying a second portion of the tone mapping curve above the input signal data value corresponding to the first point based on the data indicative of the characteristic of the display device;

performing tone mapping for the content item based on modified tone mapping curve to obtain a tone mapped content item; and displaying the tone mapped content item.

2. The method of claim 1, wherein determining the first point comprises determining at least one of: a mid-tone of the content item; or a reference white value.

3. The method of claim 1, wherein modifying the first portion comprises adjusting the first point.

4. The method of claim 1, wherein modifying the first portion comprises adjusting a slope of the first portion.

5. The method of claim 1, wherein modifying the second portion comprises stretching the second portion.

6. The method of claim 5, wherein stretching the second portion is based on the data indicative of the characteristic of the display device and the first point.

7. The method of claim 6, wherein the data indicative of the characteristic of the display device comprises a peak brightness level of the display device, and wherein stretching the second portion comprises stretching the second portion to fit a range of brightness levels between the first point and the peak brightness level of the display device.

8. The method of claim 1, wherein the data indicative of content characteristics for the content item comprises at least one of: a minimum brightness, a maximum brightness, and a mid-tone.

9. A non-transitory program storage device comprising instructions stored thereon to cause one or more processors to:

receive data indicative of a characteristic of a display device, data indicative of ambient light conditions, and data indicative of content characteristics for a content item;

determine a tone mapping curve for the content item based on the data indicative of content characteristics;

determine a first point along the tone mapping curve;

modify a first portion of the tone mapping curve below an input signal data value corresponding to the first point based on the data indicative of ambient light conditions;

modify a second portion of the tone mapping curve above the input signal data value corresponding to the first point based on the data indicative of the characteristic of the display device;

perform tone mapping for the content item based on modified tone mapping curve to obtain a tone mapped content item; and cause the display device to display the tone mapped content item.

10. The non-transitory program storage device of claim 9, wherein the instructions to determine the first point comprise instructions to determine at least one of a mid-tone of the content item and a reference white.

11. The non-transitory program storage device of claim 9, wherein the instructions to modify the first portion comprise instructions to adjust the first point.

12. The non-transitory program storage device of claim 9, wherein the instructions to modify the first portion comprise instructions to adjust a slope of the first portion.

13. The non-transitory program storage device of claim 9, wherein the instructions to modify the second portion comprise instructions to stretch the second portion.

14. The non-transitory program storage device of claim 13, wherein the data indicative of the characteristic of the display device comprises a peak brightness level of the display device, and wherein the instructions to stretch the second portion further comprise instructions to stretch the second portion to fit a range of brightness levels between the first point and the peak brightness level of the display device.

15. A device, comprising:

a memory;

a display, wherein the display is characterized by a characteristic; and one or more processors operatively coupled to the memory, wherein the one or more processors are configured to execute instructions causing the one or more processors to:

receive data indicative of the characteristic of the display, data indicative of ambient light conditions, and data indicative of content characteristics for a content item;

determine a tone mapping curve for the content item based on the data indicative of content characteristics;

determine a first point along the tone mapping curve;

modify a first portion of the tone mapping curve below an input signal data value corresponding to the first point based on the data indicative of ambient light conditions;

modify a second portion of the tone mapping curve above the input signal data value corresponding to the first point based on the data indicative of the characteristic of the display;

perform tone mapping for the content item based on modified tone mapping curve to obtain a tone mapped content item; and cause the display to display the tone mapped content item.

16. The device of claim 15, wherein the instructions to determine the first point comprise instructions causing the one or more processors to determine at least one of a mid-tone of the content item and a reference white.

17. The device of claim 15, wherein the instructions to modify the first portion comprise instructions causing the one or more processors to adjust the first point.

18. The device of claim 15, wherein the instructions to modify the first portion comprise instructions causing the one or more processors to adjust a slope of the first portion.

19. The device of claim 15, wherein the instructions to modify the second portion comprise instructions causing the one or more processors to stretch the second portion.

20. The device of claim 19, wherein the data indicative of the characteristic of the display comprises a peak brightness level of the display, and wherein the instructions to stretch the second portion further comprise instructions causing the one or more processors to stretch the second portion to fit a range of brightness levels between the first point and the peak brightness level of the display.

* * * * *